Figure 1:
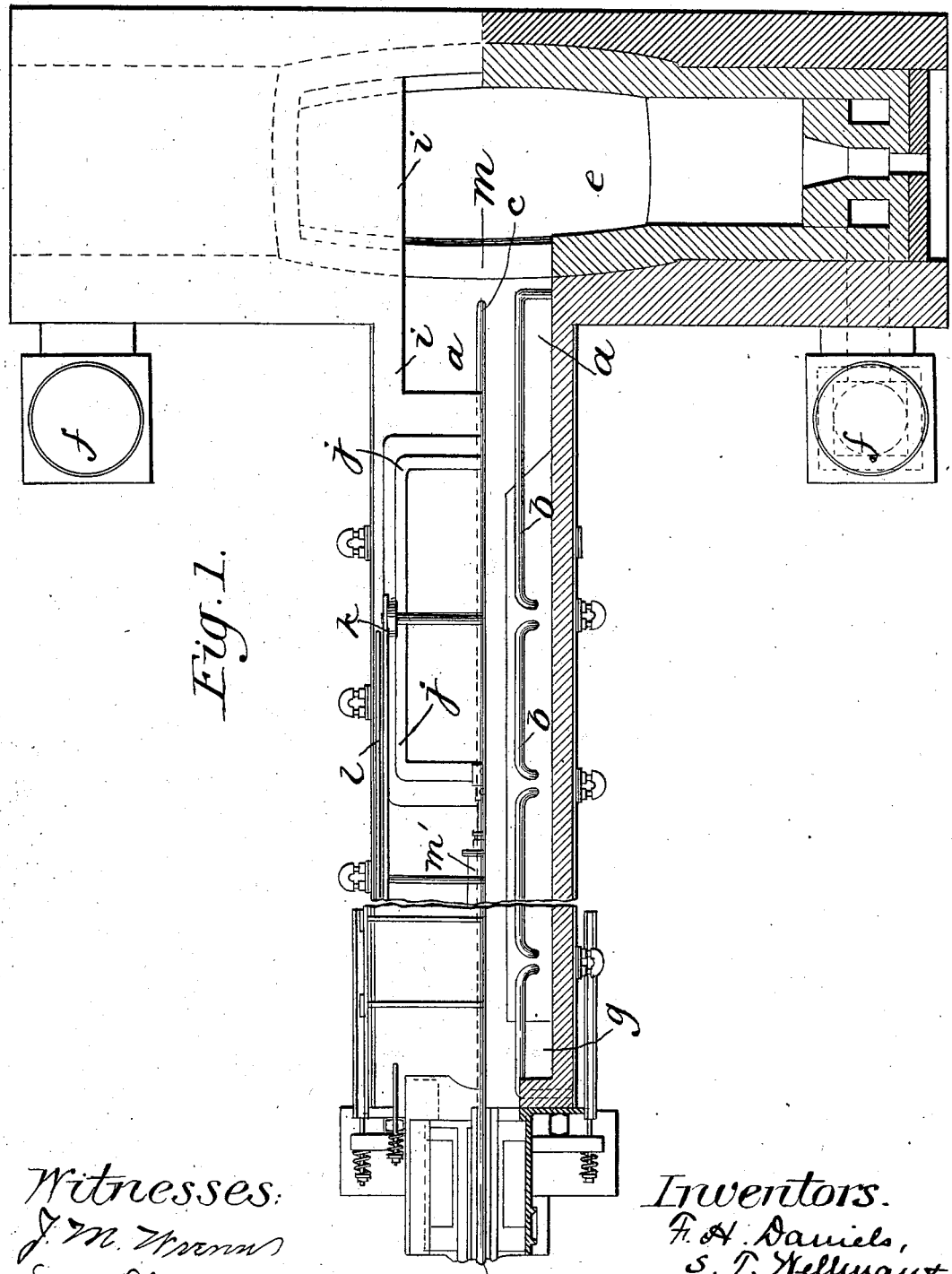

No. 724,551. PATENTED APR. 7, 1903.
F. H. DANIELS & S. T. & C. H. WELLMAN.
INGOT HEATING FURNACE.
APPLICATION FILED MAY 13, 1902.

NO MODEL. 2 SHEETS—SHEET 1.

Witnesses:
J. M. Wrenn
E. M. Olmsted

Inventors.
F. H. Daniels,
S. T. Wellman+
C. H. Wellman
by Pennie & Goldsborough attys

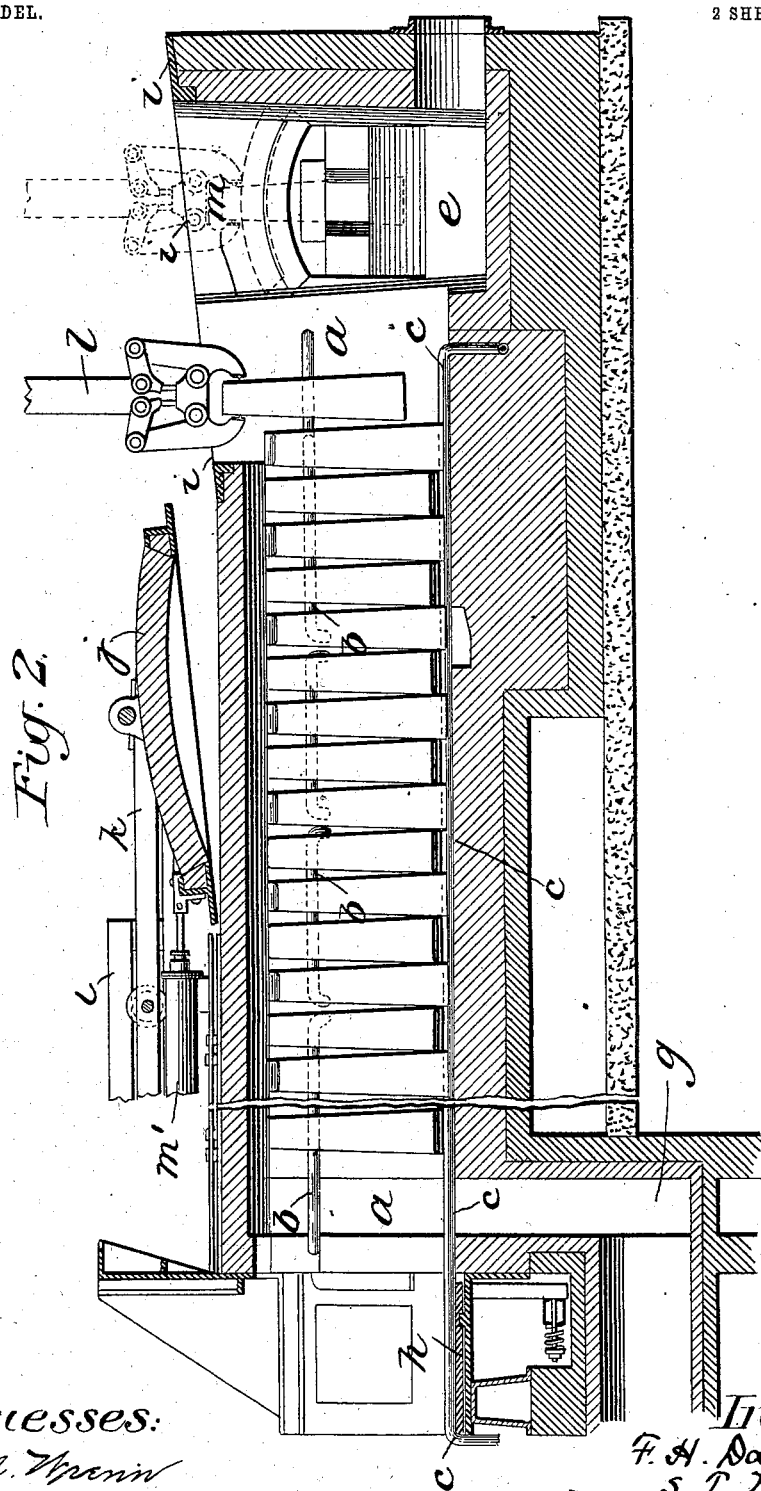

UNITED STATES PATENT OFFICE.

FRED H. DANIELS, OF WORCESTER, MASSACHUSETTS, AND SAMUEL T. WELLMAN AND CHARLES H. WELLMAN, OF CLEVELAND, OHIO; SAID WELLMAN AND WELLMAN ASSIGNORS TO THE WELLMAN-SEAVER-MORGAN ENGINEERING COMPANY, OF CLEVELAND, OHIO, A CORPORATION OF OHIO.

INGOT-HEATING FURNACE.

SPECIFICATION forming part of Letters Patent No. 724,551, dated April 7, 1903.

Application filed May 13, 1902. Serial No. 107,145. (No model.)

*To all whom it may concern:*

Be it known that we, FRED H. DANIELS, residing at Worcester, county of Worcester, State of Massachusetts, and SAMUEL T. WELLMAN and CHARLES H. WELLMAN, residing at Cleveland, county of Cuyahoga, State of Ohio, all citizens of the United States, have invented certain new and useful Improvements in Ingot-Heating Furnaces; and we hereby declare the following to be a full, clear, and exact description of the invention, such as will enable others skilled in the art to which it appertains to make and use the same.

In an application filed May 13, 1902, Serial No. 107,143, we have illustrated an ingot-heating furnace of the continuous type comprising two chambers, one consisting of a long narrow chamber, into one end of which the ingots are introduced and through which they are pushed to the other end, and the other chamber being an enlarged chamber wherein is maintained a much higher temperature and into which the ingots are transferred from the first-named chamber. Both chambers are fired from the same source of heat, and the products of combustion pass from the end chamber directly into and through the receiving-chamber. The temperature of the end chamber is maintained at what is known as a "finishing heat," and this chamber therefore constitutes a finishing-chamber analogous in function to the old soaking-pit. The other chamber is maintained at a more moderate heat and the ingots are gradually heated as they pass through this chamber preparatory to being transferred to the other chamber, where they receive final treatment and are thence taken to the mill-rolls.

Several specific forms have been devised coming under the broad invention covered by the application above referred to, and the present invention is confined to one of these forms and relates more especially to the manner of connecting the two chambers together, so that the ingots may be transferred from one to the other.

In general features of construction the present form embodies all the essential requirements of the form disclosed in the above-named application, and the differences consist entirely in the construction of the finishing-chamber and the manner of getting the ingots into it from the heating-chamber.

The arrangement will be best understood from the following description when taken in connection with the accompanying drawings, in which—

Figure 1 shows the furnace in plan, one-half being horizontally sectioned; and Fig. 2 is a vertical central longitudinal section.

Referring to the views, $a$ denotes the heating-chamber. In shape and extent it is similar to that of the Patent No. 645,305, granted to us March 13, 1900. Along the sides of this chamber run lines of water-cooled pipes $b\ b$, against which the upper ends of the ingots lean centrally. Along the floor of the chamber runs a similar pipe $c$, by which the ingots are supported and on which they slide as they are pushed from the end $d$, where they are introduced to the opposite end, whence they are transferred to the finishing-chamber $e$. In the construction illustrated in the above application this finishing-chamber was wide enough for the ingots to lie crosswise on its floor and the ingots were simply tipped over and pulled onto the floor of the finishing-chamber by an instrument introduced through a side door in line with the heating-chamber. In the present construction the finishing-chamber is narrower, as will be understood from Fig. 2, and the ingots as they come from the heating-chamber are set up on end. The communication between the two chambers here is substantially the same as before—that is to say, there is no wall separating them—and the connecting-passage is adapted for the transference of the ingots sidewise, as well as for the free passage of the products of combustion.

The heating-chamber derives its heat from the finishing-chamber, which is heated by generators, one located, preferably, at each end, as shown at $f$ in Fig. 1. The interior capacity of the finishing-chamber is greater than that of the heating-chamber, and it therefore constitutes, in effect, a storage-reservoir for the other, enabling the heat of the latter to be more easily maintained at a uniform temperature. The products of combustion pass through the heating-chamber in opposition to the movement of the ingots and go off to the stack through the passage $g$. The ingots are pushed from the platform $h$ into and through the chamber $a$ by any sort of a pusher, the supporting-pipe $c$ being preferably continued through the door at this end of the furnace onto the platform to form a continuous track from one end of the furnace to the other.

In the form shown in the above-named application there was no door or other opening in the top of either of the chambers $a\ e$, the ingots being transferred by an instrument introduced through the side of the finishing-chamber. In the present arrangement, however, there is a door-opening $i$, extending from a point in the roof of the heating-chamber transversely across the roof of the finishing-chamber, as best shown in Fig. 2, and a single door $j$ is provided of a length and size to cover or uncover both openings at one operation. The seat for this door is upwardly inclined toward the outer wall of the finishing-chamber, as shown in Fig. 2, and the door is arranged to slide over the back of the heating-chamber in opening. So far as the present invention is concerned the door may be operated by any suitable means; but we show it herein as pivoted centrally to the side arms of a carriage $k$, which runs upon a track $l$, and the power to operate the door is provided by a hydraulic cylinder $m'$, whose piston-rod is connected to one edge.

Such being the construction of the present improvement, the operation is precisely the same as that disclosed in the former application, excepting only in the manner of transferring the ingots. When this operation is to be performed with this construction, the door $j$ is slid back so as to uncover the openings in the roofs of both chambers. The end ingots will therefore be accessible through this opening, and overhead power-tongs $l$ are provided to seize the ingots by their upper ends, as shown in Fig. 2, and lift them off the floor of the heating-chamber. The tongs are then swung to one side, passing the ingots through the opening $m$ into the finishing-chamber, where they are lowered onto the floor and set up on end. It is to be noted as to this arrangement that the ingots do not have to be lifted over any partition separating the upper part of the chambers, but merely raised up off the supporting-pipe $c$ in the floor of the heating-chamber; also, that the uncovering and covering of the two openings by the single door may be so quickly and easily effected as to lose little of the useful heat in either chamber.

Having thus described our invention, what we claim, and desire to secure by Letters Patent, is—

An ingot-heating furnace comprising two communicating chambers in combination, viz., a continuous chamber into one end of which the ingots are introduced and through which they are progressively advanced in opposition to the passage of the products of combustion, and a finishing-chamber at the discharge end of the continuous chamber, said continuous chamber being heated by the products of combustion passing into and through it from the finishing-chamber, an opening in the roof of the heating-chamber at the discharge end through which an implement may be lowered to seize an ingot, and an opening in the roof of the finishing-chamber in proximity to the first-named opening and through which the implement holding the ingot may be passed into said finishing-chamber, and a single door adapted to close both openings at one operation.

In testimony whereof we affix our signatures in the presence of witnesses.

FRED H. DANIELS.
SAMUEL T. WELLMAN.
CHARLES H. WELLMAN.

Witnesses as to Fred H. Daniels:
W. E. SNYDER,
JAMES W. SMITH.

Witnesses as to Samuel T. and Charles H. Wellman:
C. W. COMSTOCK,
JNO. W. SEAVER.